1,985,395

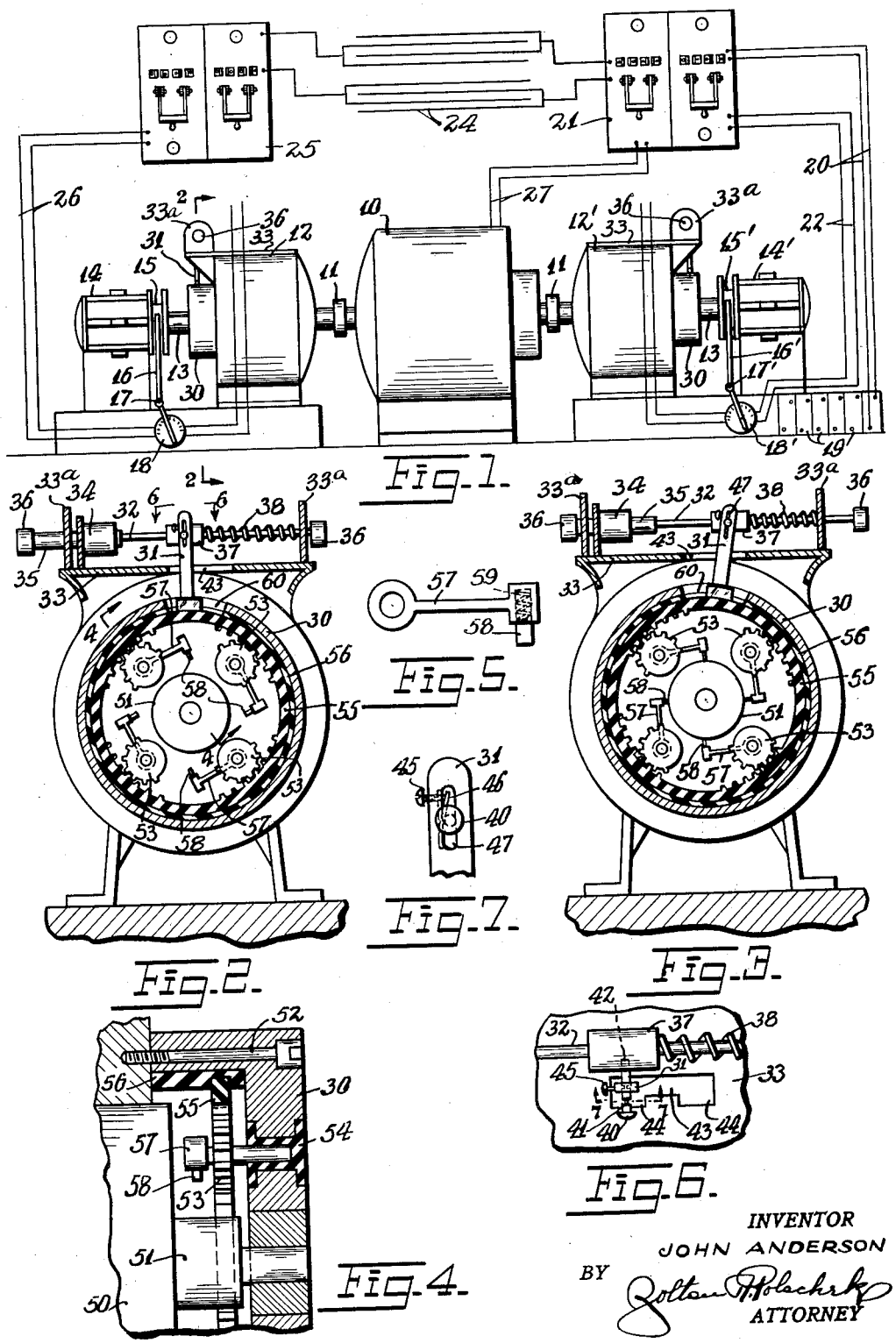
Dec. 25, 1934.  J. ANDERSON  1,985,395
BRUSH CONTROL FOR MOTOR COMMUTATORS
Filed Aug. 14, 1933
INVENTOR
JOHN ANDERSON
ATTORNEY Patented Dec. 25, 1934

UNITED STATES PATENT OFFICE 1,985,395

BRUSH CONTROL FOR MOTOR COMMUTATORS

John Anderson, New York, N. Y.

Application August 14, 1933, Serial No. 684,991

6 Claims. (Cl. 171—324)

This invention relates to new and useful improvements in a brush control or commutator for motors, and the like.

The invention has for an object the construction of a brush control which is adapted to raise the brushes free from the commutator when desired to stop the motor or so that the brushes may be repaired or replaced.

Still further the invention contemplates the provision of a mechanism controlled by a solenoid to move the brushes from their operative to their inoperative positions.

As another object of this invention it is proposed to provide a simple mechanism which includes an annular rack adapted to be pivoted and arranged to transfer motion to pinions supporting the brushes so as to pivotally move the brushes from their operative to their inoperative positions.

Still further the invention contemplates an arrangement whereby the brushes may be locked in either of the positions mentioned against the action of the solenoid control mechanism.

This invention also contemplates the arrangement of an arm adapted to be moved from one to another position and to work in a bayonet slot to control whether the solenoid mechanism can operate the brushes.

Still further the invention proposes the illustration of several motors and dynamos connected together to show the application of the brush control for the commutator thereof.

As another object of this invention it is proposed to construct a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure.

Fig. 1 is a schematic view of several motors and a dynamo connected together for operation and each of these devices provided with mechanisms to control the brushes of their commutators.

Fig. 2 is an enlarged vertical sectional view taken on the line 2—2 of Fig. 1.

Fig. 3 is a view similar to Fig. 2 but showing the mechanism in a different position.

Fig. 4 is a sectional view taken on the line 4—4 of Fig. 2.

Fig. 5 is a detailed view of one of the brushes per se.

Fig. 6 is a fragmentary plan view looking in the direction of the line 6—6 of Fig. 2.

Fig. 7 is a fragmentary detailed view of the upper end of a radial arm used in the device, this form being as though taken on the line 7—7 of Fig. 6.

In Fig. 1 a dynamo 10 is shown connected by couplings 11 to motors 12 and 12' arranged on opposite sides thereof. These motors have their shafts 13 and 13' continued and connected with speed regulators 14 and 14'. These speed regulators are of the weight type and include groove members 15 and 15' adapted to move according to the speed of rotation and to move fork members 16 and 16' pivotally mounted intermediately at 17 and 17' which connect with electrical controls 18 and 18'.

A gang of batteries 19 are shown in a circuit 20 which connects with a switch board 21. Another circuit 22 from the switch board 21 connects with the controller 18' which in turn is connected with the motor 12' illustrated at the right. Condensers 24 connect the switch board 21 with another switch board 25. A circuit 26 from the board 25 connects with the controller 18 and is connected to operate the motor 12 illustrated at the left. The dynamo 10 is connected with a circuit 27 connected with a switch board 21.

The arrangement is such that the battery 19 may operate the motor 12' at the right and cause operation of the generator 10 which is connected with the condensers 24 or other mechanism. A source of power control by the switch board 25 may be used to operate the motor 12 at the left. The details of the switch board, the motors, the commutators, the controllers and in fact the entire details of the device will not be explained since they are not important as far as details are concerned, except for the fact that each of the motors 12 and 12' is provided with a brush control according to this invention hereinafter fully described.

Each of the motors is provided with a removable casing end 30 housing the brush control mechanism. Radial arms 31 project from the end casing sections 30 and connect with solenoid control equipments to operate the brushes. More particularly each radial arm 31 connects with a rod 32 slidably mounted in the arms 33ª of a bracket 33. A solenoid 34 has a core 35 which is connected with the rod 32 so as to cause motion of the rod when operated. Heads 36 are secured upon the ends of the joined solenoid core and rod 32 so as to limit sliding of these parts. A collar 37 is fixed upon the rod 32 and has an expansion spring 38 connected between the collar 37 and one of the arms 33ª of the bracket 33 so as to normally urge the rod 32 in a neutral position.

The connection between the radial arms 31 and the rod 32 is illustrated in detail in Figs. 6 and 7. This connection comprises a pin 40 projecting from the collar 37 and formed with a pair of spaced grooves 41 and 42. The radial arm 31 projects through a bayonet slot, in the bracket 33, having a main portion 43 and end offset portions 44. A set screw 45 is mounted upon the radial arm 31 and acts against a spring 46 mounted within an elongated opening 47 in the radial arm. The spring 46 is adapted to be bowed so as to engage the grooves 41 or 42 selectively. The pin 40 engages through the slot 47.

The details of the brush control may be understood from Figs. 2, 3 and 4. In these figures the armature is indicated by reference numeral 50 and is shown carrying the commutator 51. The end casing section 30 is removably mounted by the screws 52 upon the device. Pinions 53 are pivotally mounted upon insulation members 54 mounted upon the end casing section 30. These pinions mesh with an angular rack 55 which is rotatively mounted in a cylindrical insulation bushing 56 mounted within a hollow in the casing section 30. Arms 57 project from the pinions 53 carrying the brushes 58. The brushes 58 are resiliently mounted upon the ends of the arms 51. More particularly each brush 58 slidably engages within an opening in the end of the arm and a spring 59 normally urges the brush 58 into a limited extended position. The spring 59 is attached at its inner end on the base of the opening in the arm, and the outer end is attached on the brush to support the brush. An annular rack 55 is made from insulation material so as not to short circuit the brushes 54.

The radial arm 31 is fixed upon the periphery of the annular rack 55 and extends through an opening 60 in the end casing section 30. This opening 60 is of a size so that the arm may be moved to move the annular rack through a small angular distance.

The operation of the device may best be understood by first considering Fig. 2. In this figure the spring 38 is holding the rod 32 in one position, in which position the annular rack 55 engages the pinions 53 in such a manner so that the brushes 58 are out of contact with the commutator 51. If it is desired that the brushes engage the commutator it is necessary that the solenoid 34 be energized. This will cause its core 35 to move to a position as illustrated in Fig. 3 which moves the rod 32 correspondingly and pivots the arm 31 to slightly rotate the rack 55 and turn each of the pinions 53 simultaneously to move the brushes 58 in contact with the commutator.

The radial arm 31 works in the main portion 43 of the bayonet slot. The bracket 33 is attached upon the motor casing. If it is desired to latch the brushes either in their contacting positions or their inoperative positions it is merely necessary that the set screw 45 be loosened and the radial arm 31 flexed to a position in which the set screw 45 may be again tightened but this time to engage the groove 41. The end of the radial arm 31 is then in one of the ends 44 of the bayonet slot so that even though the solenoid 34 is operated the brushes will be held against motion. The radial arm 31 may be latched into either end 44 of the bayonet slot depending upon whether it is desired that the brushes be in contact with, or out of contact with, the commutator.

The details of the construction of the commutator with the dynamo or motor will not be gone into here since such connection may be made as is generally known.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. In combination with a motor or other device having a commutator, brushes for said commutator on pivotally mounted arms and insulated from said device, pinions fixed upon the pivots of said brushes, an annular rack meshing with said pinions and insulated from said device, and means for turning said rack to move the brushes into operative or inoperative positions, comprising a radial arm projecting from said annular rack, a bracket, a rod slidably mounted in said bracket and connected with said radial arm to move the radial arm so as to pivot the rack, and a solenoid connected with said rod to move the rod.

2. In combination with a motor or other device having a commutator, brushes for said commutator on pivotally mounted arms and insulated from said device, pinions fixed upon the pivots of said brushes, an annular rack meshing with said pinions and insulated from said device, and means for turning said rack to move the brushes into operative or inoperative positions, comprising a radial arm projecting from said annular rack, a bracket, a rod slidably mounted in said bracket and connected with said radial arm to move the radial arm so as to pivot the rack, and a solenoid connected with said rod to move the rod, a spring being associated with the rod for urging the rod into a neutral position.

3. In combination with a motor or other device having a commutator, arms supporting brushes for the commutator and pivotally mounted, pinions fixed upon the pivots of said arms, an annular rack meshing with said pinions, a radial arm projecting from said annular rack, a bracket fixed upon said motor and having a bayonet slot through which said radial arm extends, a rod slidably mounted upon said bracket and connected for moving said radial arm, and means for moving said rod.

4. In combination with a motor or other device having a commutator, arms supporting brushes for the commutator and pivotally mounted, pinions fixed upon the pivots of said arms, an annular rack meshing with said pinions, a radial arm projecting from said annular rack, a bracket fixed upon said motor and having a bayonet slot through which said radial arm extends, a rod slidably mounted upon said bracket and connected for moving said radial arm, and means for moving said rod, comprising a solenoid connected with said rod and a spring urging said rod into a neutral position.

5. In combination with a motor or other device having a commutator, arms supporting brushes for the commutator and pivotally mounted, pinions fixed upon the pivots of said arms, an annular rack meshing with said pinions, a radial arm projecting from said annular rack, a bracket fixed upon said motor and having a bayonet slot through which said radial arm extends, a rod slidably mounted upon said bracket and connected for moving said radial arm, and means for moving said rod, said radial arm being flexible, and means for flexing said radial arms to hold it against motion in one or another end of said bayonet slot.

6. In combination with a motor or other device having a commutator, arms supporting brushes for the commutator and pivotally mounted, pinions fixed upon the pivots of said arms, an annular rack meshing with said pinions, a radial arm projecting from said annular rack, a bracket fixed upon said motor and having a bayonet slot through which said radial arm extends, a rod slidably mounted upon said bracket and connected for moving said radial arm, and means for moving said rod, said radial arm being flexible, and means for flexing said radial arm to hold it against motion in one or another end of said bayonet slot, said means for flexing the radial arm comprising a set screw mounted upon said radial arm and adapted to clamp upon an element associated with said rod.

JOHN ANDERSON.